United States Patent
Dohi et al.

(10) Patent No.: US 8,284,485 B2
(45) Date of Patent: Oct. 9, 2012

(54) ILLUMINATION OPTICAL SYSTEM AND FLUORESCENT MICROSCOPE

(75) Inventors: Masahito Dohi, Tokyo (JP); Kenji Kawasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 132 days.

(21) Appl. No.: 12/822,270

(22) Filed: Jun. 24, 2010

(65) Prior Publication Data

US 2010/0328765 A1 Dec. 30, 2010

(30) Foreign Application Priority Data

Jun. 25, 2009 (JP) .................................. 2009-150579
Jun. 24, 2010 (JP) .................................. 2010-143612

(51) Int. Cl.
*F21V 5/04* (2006.01)
*G02B 21/08* (2006.01)

(52) U.S. Cl. .......................... 359/385; 359/388; 359/389

(58) Field of Classification Search .................. 359/385, 359/388, 389
See application file for complete search history.

(56) References Cited

U.S. PATENT DOCUMENTS

| | | | | |
|---|---|---|---|---|
| 5,713,660 | A * | 2/1998 | Mori et al. ..................... | 362/268 |
| 5,923,475 | A * | 7/1999 | Kurtz et al. ..................... | 359/619 |
| 6,898,005 | B2 * | 5/2005 | Kusaka et al. .................. | 359/388 |
| 6,985,288 | B2 * | 1/2006 | Miyashita et al. .............. | 359/385 |
| 6,989,926 | B2 * | 1/2006 | Kruger et al. ................... | 359/388 |
| 7,436,591 | B2 | 10/2008 | Mizusawa | |
| 7,480,095 | B2 | 1/2009 | Mizusawa | |
| 8,014,064 | B2 * | 9/2011 | Shimamoto ..................... | 359/385 |
| 8,040,596 | B2 | 10/2011 | Mizusawa | |
| 2009/0073695 | A1 * | 3/2009 | Shimamoto ..................... | 362/268 |
| 2009/0195866 | A1 * | 8/2009 | Kawaski et al. ............... | 359/385 |
| 2009/0303582 | A1 * | 12/2009 | Karasawa ....................... | 359/363 |
| 2011/0235170 | A1 * | 9/2011 | Kawasaki ....................... | 359/385 |

FOREIGN PATENT DOCUMENTS

| | | | | |
|---|---|---|---|---|
| JP | 09090232 | A | * | 4/1997 |
| JP | 2002090635 | A | * | 3/2002 |
| JP | 2003005083 | A | * | 1/2003 |
| JP | 2004-004169 | A | | 1/2004 |
| JP | 2005043517 | A | * | 2/2005 |
| JP | 2005-283879 | A | | 10/2005 |
| JP | 2005-326721 | A | | 11/2005 |
| JP | 2007078571 | A | * | 3/2007 |
| JP | 2007147743 | A | * | 6/2007 |
| JP | 2007-322579 | A | | 12/2007 |
| JP | 2007-333833 | A | | 12/2007 |
| JP | 2009-069691 | A | | 4/2009 |
| JP | 2009-276544 | A | | 11/2009 |

* cited by examiner

*Primary Examiner* — Mark Consilvio
(74) *Attorney, Agent, or Firm* — Holtz, Holtz, Goodman & Chick, PC

(57) ABSTRACT

An illumination optical system which irradiates a sample surface with light through an illuminating lens includes: a light source; a condensing optical system receiving the light emitted from the light source; and a lens array optical system including a first lens array surface and a second lens array surface each formed by a plurality of lens elements. The first lens array surface has a conjugate relation with a back focal position of the illuminating lens. The second lens array surface is placed at a back focal position of the lens array optical system, has a conjugate relation with a pupil position of the illuminating lens, and the light source and the condensing optical system are arranged to form an image of the light source on the first lens array surface.

10 Claims, 19 Drawing Sheets

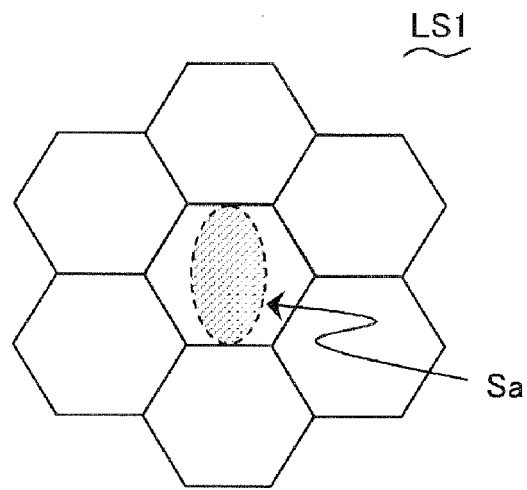
F I G. 3 A

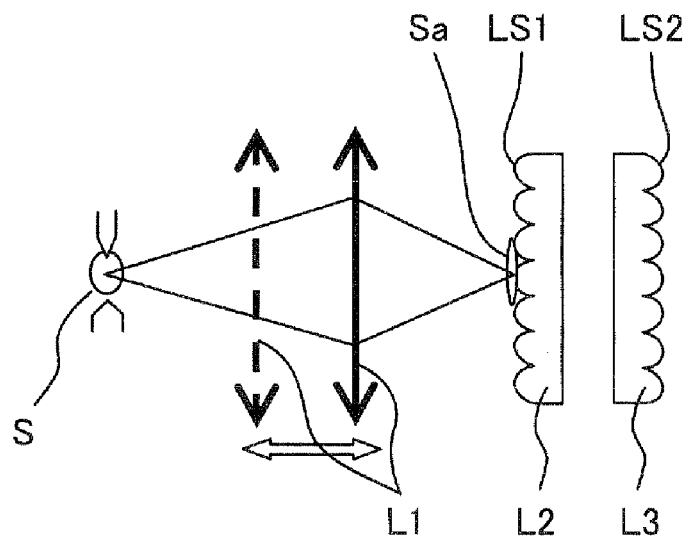
F I G. 5 A

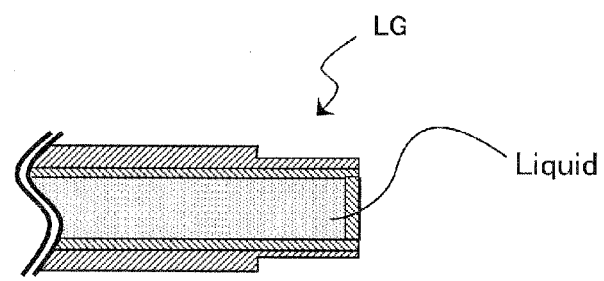
F I G. 7B

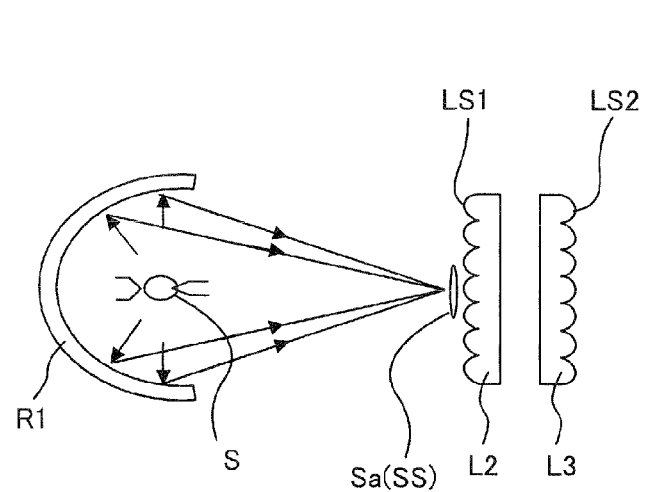
F I G. 8

ILLUMINATION OPTICAL SYSTEM AND FLUORESCENT MICROSCOPE

CROSS REFERENCE TO RELATED APPLICATIONS

This application is based upon and claims the benefit of priority from the prior Japanese Patent Application No. 2009-150579, filed Jun. 25, 2009 and No. 2010-143612, filed Jun. 24, 2010, the entire contents of which are incorporated herein by this reference.

BACKGROUND OF THE INVENTION

1. Field of the Invention

The present invention relates to an illumination optical system and a fluorescent microscope.

2. Description of the Related Art

Critical illumination and Koehler illumination are well known as typical illuminating method.

The critical illumination is an illuminating method for forming a light source image on a sample. Although bright illumination can be realized in the critical illumination, the distribution of luminance on a sample depends on the luminance distribution for the physical expansion of a light source (hereinafter referred to as the "luminance distribution" of a light source). To be more practical, the luminance distribution of a light source image depending on the luminance distribution of a light source and a projection magnification can be the luminance distribution on a sample as is. Therefore, it is hard to uniformly illuminate the sample.

On the other hand, the Koehler illumination is an illuminating method for forming a light source image at the position of the pupil of an objective in the illumination of, for example, a fluorescent microscope etc., and forming an image of a field stop on a sample. The luminance obtained by the Koehler illumination is inferior to the luminance by the critical illumination. However, since the luminance distribution on the sample does not depend on the luminance distribution of a light source, the sample can be illuminated more uniformly.

Thus, there is trade-off between the uniformity in illumination and the luminance. However, since the uniformity in illumination is generally more important in illuminating a microscope, the Koehler illumination is widely used for the illumination of a microscope.

As the technology for further improving the uniformity in illumination in the Koehler illumination, the Japanese Laid-open Patent Publication No. 2005-283879 and the Japanese Laid-open Patent Publication No. 2004-004169 have been disclosed. In the Koehler illumination, although the unevenness in illumination depending on the luminance distribution of a light source can be suppressed, the unevenness in illumination depending on the characteristic (hereinafter referred to as a "light distribution characteristic") of different luminance for each angle with respect to a light source cannot be suppressed. In the technology of the Japanese Laid-open Patent Publication No. 2005-283879 and the Japanese Laid-open Patent Publication No. 2004-004169, the unevenness in illumination depending on the light distribution characteristic of a light source can be suppressed by forming a plurality of light source images using a fly eye lens. Thus, a sample can be furthermore uniformly illuminated.

Incidentally, the illuminating state requested to an illumination optical system for a microscope is not constantly determined. That is, the uniformity in illumination can be the most important. And the other times, the luminance can be improved at the cost of the uniformity in illumination. Thus, the illumination optical system for a microscope is requested to have the function of adjusting the balance between the uniformity and the luminance in illumination in addition to the basic uniformity of illumination.

SUMMARY OF THE INVENTION

An aspect of the present invention is an illumination optical system which irradiates a sample surface with light through an illuminating lens, and includes: a light source; a condensing optical system for receiving the light emitted from the light source; and a lens array optical system including a first lens array surface and a second lens array surface each formed by a plurality of lens elements. The first lens array surface has a conjugate relation with the back focal position of the illuminating lens, the second lens array surface is placed at the back focal position of the lens array optical system and has a conjugate relation with the pupil position of the illuminating lens, and the light source and the condensing optical system are formed so that an image of the light source can be formed on the first lens array surface.

Another aspect of the present invention is a fluorescent microscope, includes an illumination optical system which irradiates a sample surface with light through an illuminating lens, and the illumination optical system includes: a light source; a condensing optical system for receiving the light emitted from the light source; and a lens array optical system including a first lens array surface and a second lens array surface each formed by a plurality of lens elements. The first lens array surface has a conjugate relation with the back focal position of the illuminating lens, the second lens array surface is placed at the back focal position of the lens array optical system and has a conjugate relation with the pupil position of the illuminating lens, and the light source and the condensing optical system are formed so that an image of the light source formed on the first lens array surface.

BRIEF DESCRIPTION OF THE DRAWINGS

The present invention will be more apparent from the following detailed description when the accompanying drawings are referenced.

FIGS. 3A and 3B are explanatory views of the operation of a lens array optical system when the light source image of the illumination optical system exemplified in FIG. 2 is small;

FIG. 5A exemplifies a method of switching between the first illuminating state and the second illuminating state of an illumination optical system by changing the distance between the light source and the collector lens;

FIG. 7B is a sectional view of the liquid fiber included in the illumination optical system exemplified in FIG. 7A;

FIG. 8 illustrates the outline of another variation example of a configuration of the illumination optical system according to the embodiment 1 of the present invention;

DESCRIPTION OF THE PREFERRED EMBODIMENTS

The embodiments of the present invention are described below with reference to the attached drawings.

Embodiment 1

Figure 1:
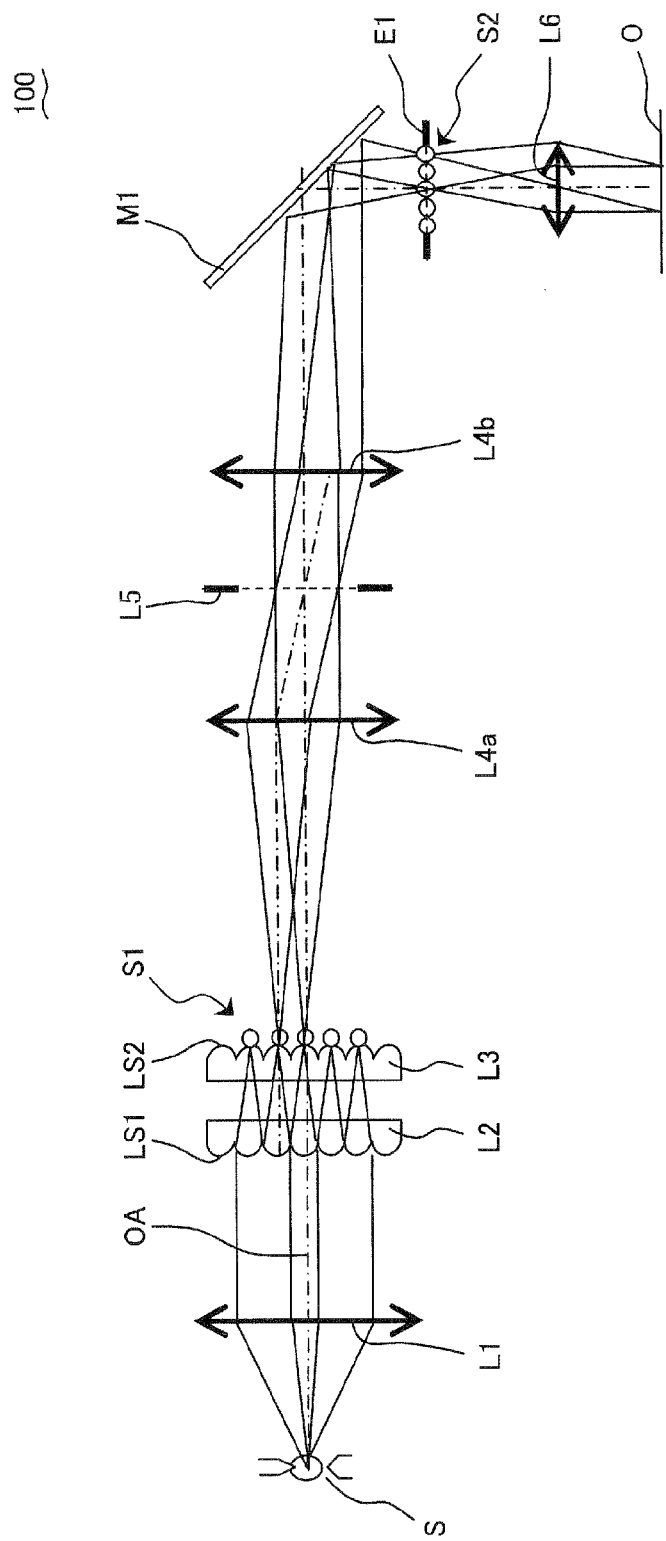
FIG. 1 illustrates the outline of an example of a configuration of the illumination optical system in the first illuminating state according to the embodiment 1 of the present invention.
Figure 2:
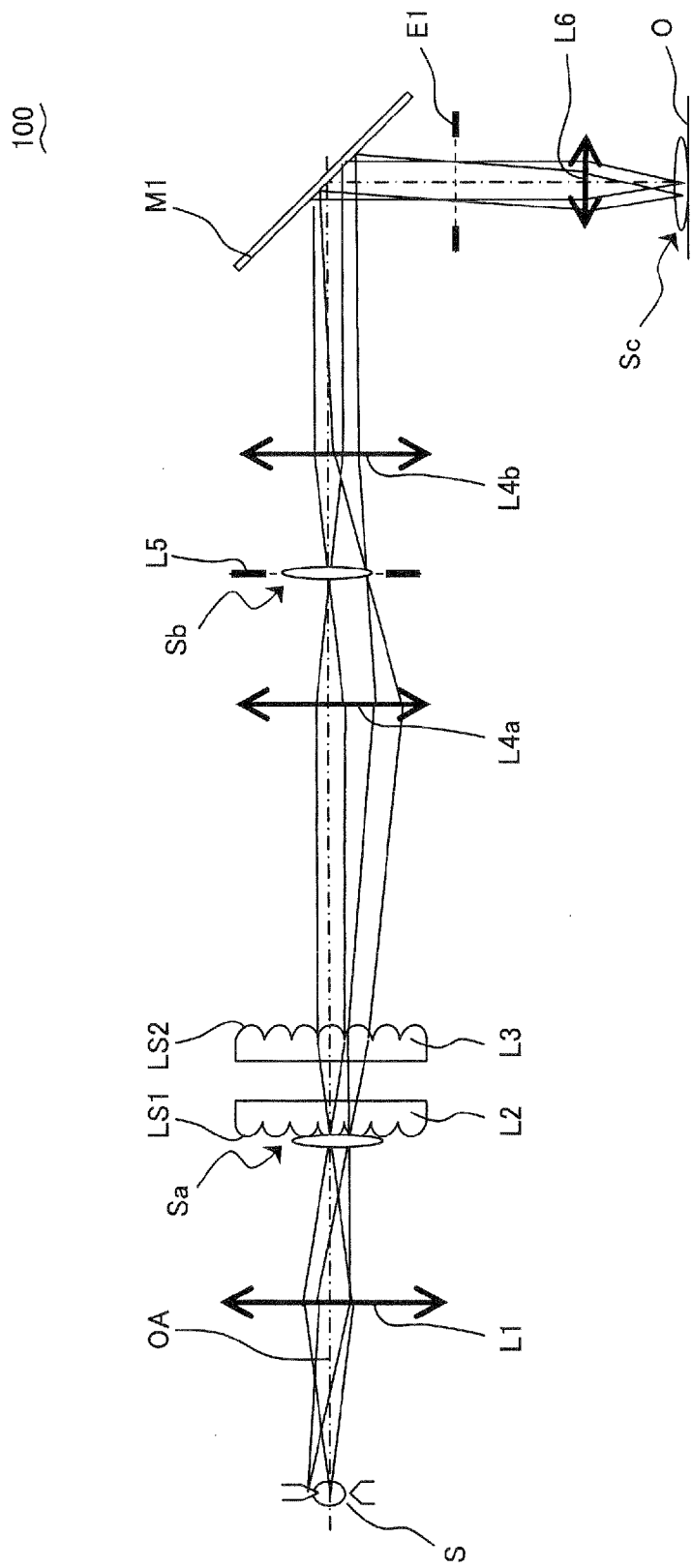
FIG. 2 illustrates the outline of an example of a configuration of the illumination optical system in the second illuminating state according to the embodiment 1 of the present invention.

FIGS. 1 and 2 illustrate the outline of the configuration of the illumination optical system according to the present embodiment.

An illumination optical system 100 exemplified in FIGS. 1 and 2 includes: sequentially from the light source S side to the sample surface O side, a light source S; a collector lens L1 where illumination light emitted from the light source S enters; a lens array optical system including, sequentially from the light source S side, a lens array L2 and a lens array L3; a relay optical system including a relay lens L4a and a relay lens L4b; a reflective element M1; and an objective 16 functioning as an illuminating lens for illuminating the sample surface O with illumination light. A field stop L5 is provided between the relay lens L4a and the relay lens L4b.

The lens array L2 has a first lens array surface LS1 on the light source S side and a flat surface on the sample surface O side. The lens array L3 has a flat surface on the light source S side and a second lens array surface LS2 on the sample surface O side. Each of the first lens array surface LS1 and the second lens array surface LS2 is formed by laying a plurality of lens elements on the surface perpendicular to the optical axis of the lens elements.

The positions of the components of the illumination optical system 100 are described below in detail.

First, the first lens array surface LS1 has a conjugate relation with the back focal position of the objective 16. The field stop L5 also has a conjugate relation with the back focal position of the objective L6. Therefore, the first lens array surface LS1, the back focal position of the objective L6, and the field stop L5 have the conjugate relations with one another. FIGS. 1 and 2 exemplify the state in which the back focal position of the objective L6 is on the sample surface O. The second lens array surface LS2 has a conjugate relation with a pupil position E1 of the objective L6.

The illumination optical system 100 configured as described above can selectively realize the Koehler illumination exemplified in FIG. 1 (hereinafter referred to as the first illuminating state) and the critical illumination exemplified in FIG. 2 (hereinafter referred to as the second illuminating state) by changing the position of the light source image formed by the collector lens L1 as a condensing optical system.

Although described later in detail, the illumination optical system 100 can realize the Koehler illumination of high uniformity while suppressing both the unevenness in illumination depending on the luminance distribution of a light source and the unevenness in illumination depending on the light distribution characteristic of a light source in the first illuminating state exemplified in FIG. 1. On the other hand, in the second illuminating state exemplified in FIG. 2, the illumination optical system 100 can realize the illumination with improved uniformity in illumination as compared with the conventional critical illumination. Therefore, in the second illuminating state, the illumination optical system 100 can realize the critical illumination brighter than the Koehler illumination (first illuminating state) and the critical illumination of higher uniformity than the conventional critical illumination.

Although the relay optical system is exemplified in FIGS. 1 and 2, the relay optical system can be omitted. In this case, the illumination optical system can be configured so that the lens array surface LS2 can match the pupil position E1 of the objective L6.

In FIGS. 1 and 2, the lens array optical system is configured by two lens arrays, but the lens array optical system can also be configured by one lens array. In this case, the lens array optical system can be configured with both surfaces of the lens array as lens array surfaces, and can be configured with the lens array surface on the sample surface O side arranged on the back focal position of the lens array optical system.

Also in FIGS. 1 and 2, the lens array L2 and the lens array L3 are formed as a periodical structure having lens elements of the same shapes, but they can be formed as a structure other than a periodical structure. The lens array L2 and the lens array L3 are to have the structure capable of dividing the luminance distribution and the light distribution characteristic of a light source.

Also in FIGS. 1 and 2, the illumination optical system 100 is configured as a incident-light illumination optical system for illuminating the sample surface O through the objective L6, but the system can also be configured as a transmission illumination optical system. In this case, a collector lens is used in lieu of the objective 16 as an illuminating lens for illuminating a sample.

In addition, the illumination optical system 100 is specifically effective when a light source including a discharge tube is used as a light source, but the light source used in the illumination optical system 100 is not limited to a light source having a discharge tube.

Each of the first illuminating state and the second illuminating state is described below in detail.

First, the first illuminating state of the illumination optical system 100 is described with reference to FIG. 1.

In the first illuminating state, the illumination light emitted from the light source S is converted into substantially parallel light by the collector lens L1, and enters the lens array optical system. The illumination light which has entered the lens array optical system is divided on the first lens array surface LS1, and each beam of divided illumination light converges on the second lens array surface LS2. Therefore, on the second lens array surface LS2, the same number of light source images S1 as the lens elements where the illumination light enters are formed.

Each light source image S1 is formed by a part of the illumination light emitted from the light source S and the illumination light whose emission angle from the light source S is in a predetermined range. Each light source image S1 has a different range of its emission angle. For example, the light source image S1 formed on an optical axis OA is formed by the illumination light at a small emission angle with respect to the optical axis OA. On the other hand, the light source image S1 formed in the position shifted from the optical axis OA is formed by the illumination light at a large emission angle with respect to the optical axis OA. Therefore, the light distribution characteristic of the light source S is divided, and the divided light distribution characteristic is inherited by each light source image S1.

Each of the thus formed light source images S1 is relayed to the pupil position E1 of the objective L6 as the light source image S2 by the relay optical system. Then, each light source image S2 illuminates the sample surface O. Therefore, the illumination light from each light source image S2 having the divided light distribution characteristic is emitted to the sample surface O, and a beam of the light overlaps one another. As a result, the unevenness in illumination depending on the light distribution characteristic of the light source S is suppressed.

In the above-mentioned first illuminating state (Koehler illumination) in which the light source image S1 is formed on the lens array surface LS2, the illumination optical system 100 can also suppress the unevenness in illumination depending on the light distribution characteristic of the light source in addition to the unevenness in illumination depending on the luminance distribution of a light source. Therefore, the illumination of high uniformity can be realized.

Next, the second illuminating state of the illumination optical system 100 is described with reference to FIG. 2.

In the second illuminating state, the illumination light emitted from the light source S is converged to the incident surface (first lens array surface LS1) of the lens array optical system by the collector lens L1, and a light source image Sa is formed on the first lens array surface LS1. Then, the light source image Sa is relayed as a light source image Sb on the field stop L5 by the lens array optical system and the relay lens L4a of the relay optical system. Furthermore, the light source image Sb is relayed to the sample surface O as a light source image Sc by the relay lens L4b of the relay optical system and the objective L6. Then, the light source image Sc illuminates the sample surface O. Thus, the illumination optical system 100 realizes the critical illumination by which a light source image is formed on the sample surface O. Since the light source image Sa in the second illuminating state is smaller than the light source image S1 in the first illuminating state, the diameter of the luminous flux in the second illuminating state is small. That is, when the heights of beams are compared at the pupil position of the objective L6 when the beams enter through the relay optical system, the diameter of the luminous flux is large because a light source image is projected in the first illuminating state, and the diameter of the luminous flux is smaller in the second illuminating state than in the first illuminating state. That is, the diameter of the luminous flux can be smaller in the second illuminating state than in the case of the Koehler illumination in the first illuminating state. Therefore, the illumination light can reach the sample surface O by suppressing the illumination light which is made wasteful by the vignetting etc. occurring in the objective L6 and the relay optical system, thereby realizing brighter illumination in the second illuminating state.

Since the illumination is performed with a small diameter of the luminous flux at the pupil of the objective L6 in the second illuminating state, bright image can be observed in the second illuminating state even if the illumination is performed by objectives having different pupil diameters, for examples, a objective having a large pupil diameter and/or a objectives having a small pupil diameter etc.

Figure 3B:
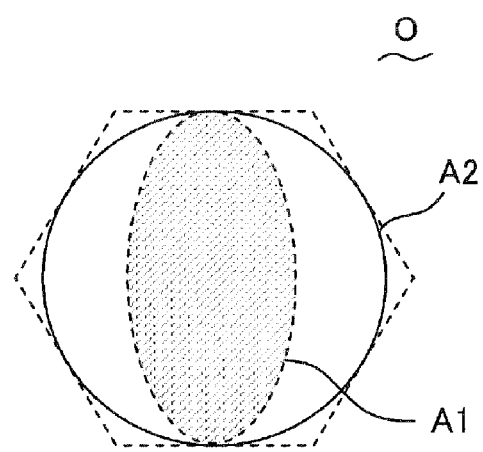
Figure 3C:
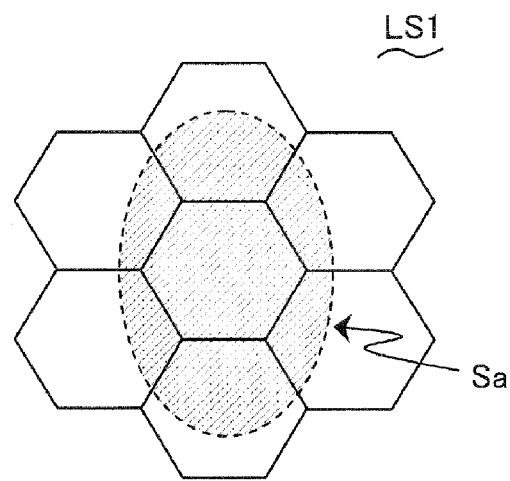
FIGS. 3C and 3D are explanatory views of the operation of a lens array optical system when the light source image of the illumination optical system exemplified in FIG. 2 is large.
Figure 3D:
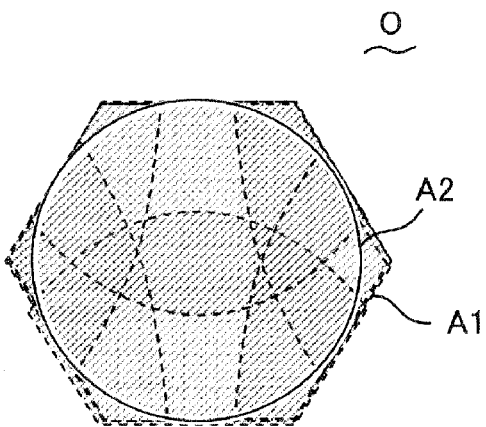
Figure 4:
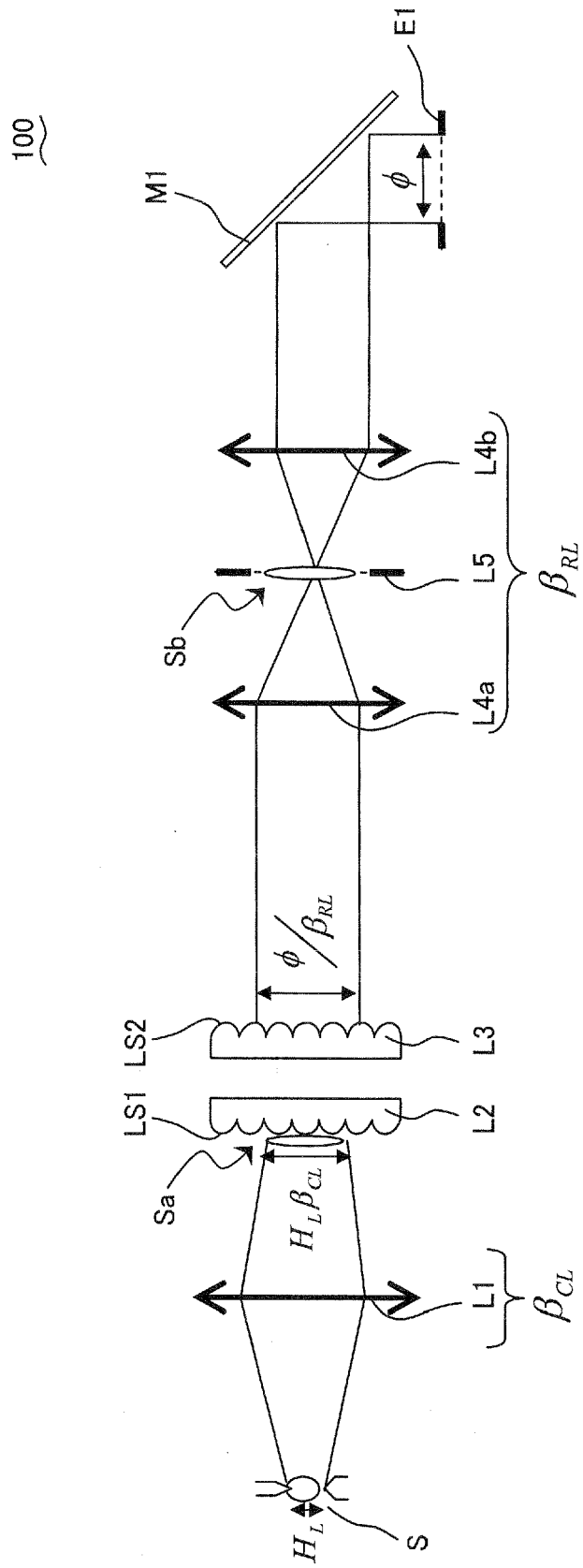
FIG. 4 is an explanatory view of the relationship between the size of a light source image and the pupil diameter of an objective of the illumination optical system exemplified in FIG. 2.

Described next is the effect of the lens array optical system of the illumination optical system 100 in the second illuminating state. FIGS. 3A and 3B are explanatory views of the effect of the lens array optical system when the light source image Sa is smaller than the lens element of the lens array optical system. FIGS. 3C and 3D are explanatory views of the effect of the lens array optical system when the light source image Sa is larger than the lens element of the lens array optical system. FIG. 4 is an explanatory view of the relationship between the size of the light source image Sa and the pupil diameter of the objective L6.

First described below is the case in which the light source image Sa formed on the first lens array surface LS1 is smaller than the lens element, that is, to be more exact, the case in which the light source image Sa is projected in one lens element.

As exemplified in FIG. 3A, when the light source image Sa is projected in one lens element, the illumination light emitted from the light source image Sa enters the lens element. Then, the illumination light reaches the sample surface O without being divided by the lens array L2. Therefore, as exemplified in FIG. 3B, the luminance distribution of an illumination range A1 on the sample surface O is equal to the luminance distribution of the light source image Sa, and the uniformity in illumination is not good. In addition, since the illumination range A1 does not satisfy a field range A2 in this case, the periphery of the field of view is not irradiated with the illumination light. Therefore, the periphery of the field of view is very dark. This also holds true with the critical illumination.

On the other hand, as exemplified in FIG. 3C, when the light source image Sa formed on the first lens array surface LS1 is larger than the lens element, the illumination light emitted from the light source image Sa enters a plurality of lens elements. Therefore, the illumination light is divided by the lens array L2, and each beam of the divided illumination light reaches the sample surface O. When the illumination light is divided, the luminance distribution of the light source S is also divided, and the divided luminance distribution is inherited by each beam of the illumination light. Therefore, as exemplified in FIG. 3D, the luminance distribution in the illumination range A1 on the sample surface O is the luminance distribution obtained by overlapping the divided luminance distribution, and the uniformity in illumination can be improved as compared with the conventional critical illumination. In this case, since the illumination range A1 satisfies the field range A2, the entire field of view is irradiated with the illumination light.

In the above-mentioned second illuminating state (critical illumination) in which the light source image Sa is formed on the first lens array surface LS1, the illumination optical system 100 can realize the illumination of higher uniformity than the conventional critical illumination by having a light source image Sa larger than a lens element of the lens array optical system.

In the second illuminating state, it is desired that the illumination optical system 100 satisfies the following conditional expression (1)

$$0.1 \leq H_L \cdot \beta_{CL} \cdot \beta_{RL}/\Phi \leq 1.3 \quad (1)$$

where $H_L$ indicates the light source height of the light source S, $\beta_{CL}$ indicates the magnification of the collector lens L1 in the second illuminating state, $\beta_{RL}$ indicates the magnification of the relay optical system, and $\Phi$ indicates the pupil diameter of the objective L6

As exemplified in FIG. 4, in the second illuminating state, the size of the light source image Sa on the first lens array surface LS1 is calculated from the light source height $H_L$ of the light source S and the magnification $\beta_{CL}$ of the collector lens L1, and calculated by $H_L \cdot \beta_{CL}$. There is a conjugate relation between the pupil position E1 of the objective L6 and the second lens array surface LS2. Therefore, when the pupil of the objective L6 is projected on the second lens array surface LS2, the size (hereinafter referred to as a reverse projection pupil diameter) is calculated from the pupil diameter $\Phi$ of the objective L6 and the magnification $\beta_{RL}$ of the relay optical system, and expressed by $\Phi/\beta_{RL}$.

That is, the conditional expression (1) regulates the relationship between the size ($H_L \cdot \beta_{CL}$) of the light source image Sa and the reverse projection pupil diameter ($\Phi/\beta_{RL}$). By satisfying the conditional expression (1), the loss of the quantity of light of the illumination light generated until the light reaches the sample surface O can be suppressed, and the illumination of high uniformity as compared with the conventional critical illumination can be realized.

When the upper limit (1.3) of the conditional expression (1) is exceeded, the light source image Sa becomes too large with respect to the reverse projection pupil diameter. In this case, since the light source image Sa is sufficiently large with respect to the lens element of the lens array L2, the uniformity in illumination is improved. However, there is a large quantity of the illumination light that passes at the periphery of the pupil of the objective L6. As a result, the quantity of light of the illumination light that can reach the sample surface O decreases.

On the other hand, when the lower limit (0.1) of the conditional expression (1) is not reached, the reverse projection pupil diameter is too larger than the light source image Sa. In this case, vignetting occurs in the relay optical system or the objective. Therefore, the quantity of light of the illumination light that can reach the sample surface O decreases. In addition, in this case, since the light source image Sa is small, the uniformity in illumination cannot be sufficiently improved. However, the uniformity in illumination can be improved by adjusting the size of the lens element of the lens array L2.

When the relay optical system is omitted, and the illumination optical system is configured such that the second lens array surface LS2 and the pupil position E1 of the objective L6 can match each other, it is desired that the conditional expression (2) can be satisfied instead of the conditional expression (1).

$$0.1 \leq H_L \cdot \beta_{CL}/\Phi \leq 1.3 \quad (2)$$

Described next is the method of switch between the first illuminating state and the second illuminating state in the illumination optical system 100 by changing the position of the light source image formed by the collector lens L1. Switching between the first illuminating state and the second illuminating state in the illumination optical system 100 can be realized by at least one of the light source S and the collector lens L1 functioning as a switching unit.

Figure 5B:
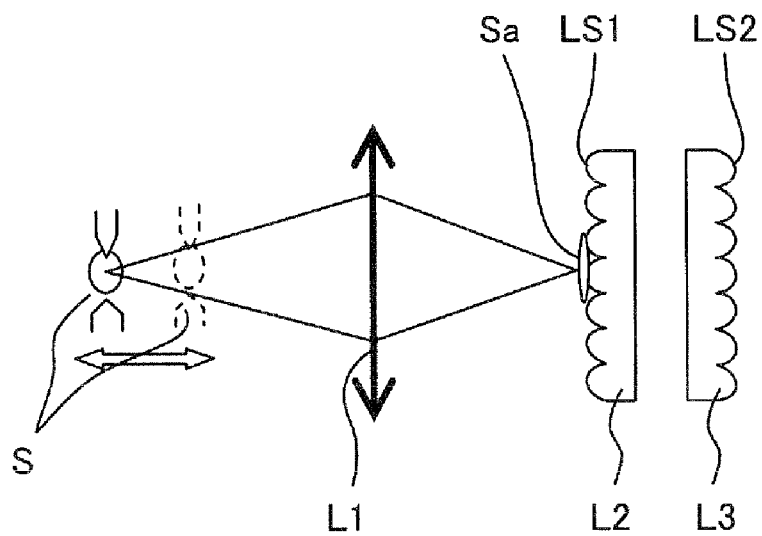
FIG. 5B exemplifies another method of switching between the first illuminating state and the second illuminating state of an illumination optical system by changing the distance between the light source and the collector lens.

FIGS. 5A and 5B exemplify the method of switching between the first illuminating state and the second illuminating state in the illumination optical system 100 by changing the distance between the light source S and the collector lens L1.

As exemplified in FIG. 5A, the illumination optical system 100 can also change the distance between the light source S and the collector lens L1 by moving the collector lens L1 in the direction of the optical axis, thereby selectively switching between the first illuminating state and the second illuminating state.

As exemplified in FIG. 5B, the illumination optical system 100 can also change the distance between the light source S and the collector lens L1 by moving the light source S in the direction of the optical axis, thereby selectively switching between the first illuminating state and the second illuminating state.

Figure 6A:
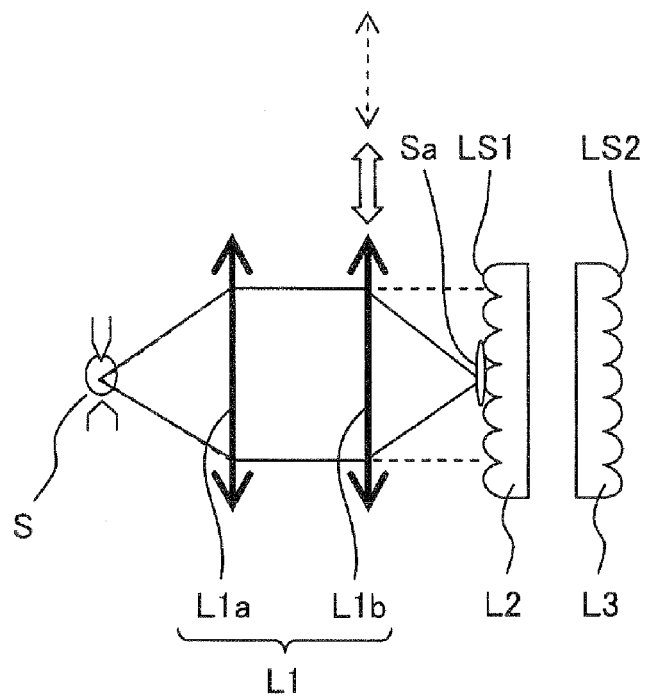
FIG. 6A exemplifies a method of switching between the first illuminating state and the second illuminating state of an illumination optical system by changing the configuration of a collector lens.
Figure 6B:
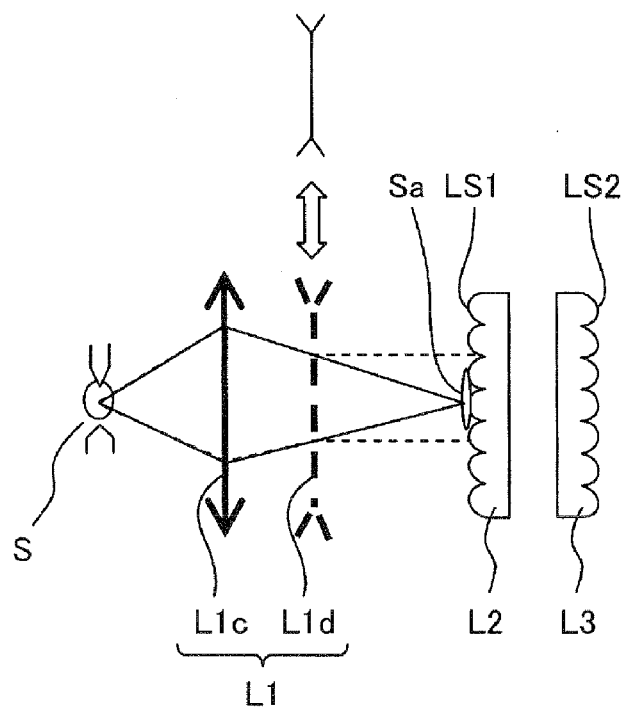
FIG. 6B exemplifies another method of switching between the first illuminating state and the second illuminating state of an illumination optical system by changing the configuration of a collector lens.
Figure 6C:
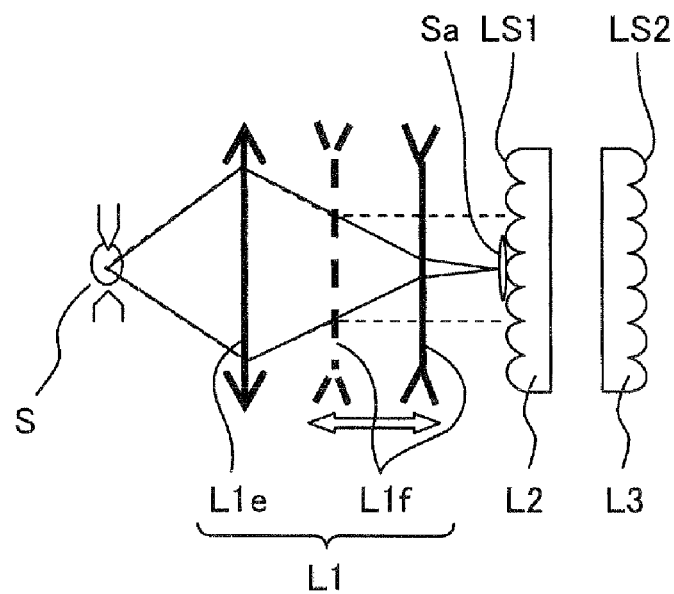
FIG. 6C exemplifies a further method of switching between the first illuminating state and the second illuminating state of an illumination optical system by changing the configuration of a collector lens.

FIGS. 6A, 6B, and 6C exemplify the method of switching between the first illuminating state and the second illuminating state in the illumination optical system 100 by changing the configuration of the collector lens L1.

As exemplified in FIG. 6A, the collector lens L1 is configured by a convex lens L1a and a convex lens L1b attachable to and detachable from the optical axis. Then, the illumination optical system 100 changes the focal length of the collector lens L1 by attaching the convex lens L1b to and detaching it from the optical axis, thereby selectively switching between the first illuminating state and the second illuminating state.

As exemplified in FIG. 6B, the collector lens L1 is configured by a convex lens L1c and a concave lens L1d attachable to and detachable from the optical axis. Then, the illumination optical system 100 changes the focal length of the collector lens L1 by attaching the concave lens L1d to and detaching it from the optical axis, thereby selectively switching between the first illuminating state and the second illuminating state.

As exemplified in FIG. 6C, the collector lens L1 is configured by a convex lens L1e and a concave lens L1f movable in the direction of the optical axis. Then, the illumination optical system 100 changes the focal length of the collector lens L1 by moving the concave lens L1f in the direction of the optical axis, thereby selectively switching between the first illuminating state and the second illuminating state.

The collector lens L1 is configured as a rough collimator optical system.

As described above, the illumination optical system 100 according to the present embodiment can selectively realize the first illuminating state of high uniformity in which both of the unevenness in illumination depending on the luminance distribution of the light source S and the unevenness in illumination depending on the light distribution characteristic of the light source S are suppressed, and the second illuminating state which is brighter than the first illuminating state and which is higher uniformity than the conventional critical illumination.

In addition, the illumination optical system 100 can switch between the first illuminating state and the second illuminating state only by changing the position of the light source image formed by the collector lens L1. Since the position of a light source image can be changed by the light source S or the collector lens L1 functioning as a switching unit as described above, the configuration of the illumination optical system 100 is not excessively complicated.

The illuminating state requested to a microscope also depends on the optical specification of an objective. Therefore, the illumination optical system 100 according to the present embodiment is preferably used for a microscope for switching various objectives different in optical specifications such as magnification etc.

Figure 7A:
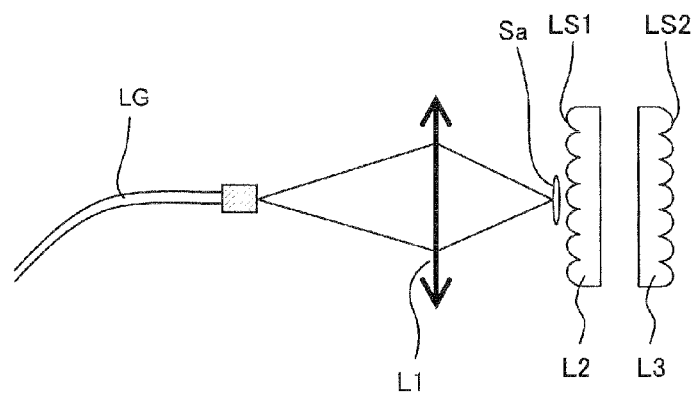
FIG. 7A illustrates the outline of a variation example of a configuration of the illumination optical system according to the embodiment 1 of the present invention.

FIG. 7A illustrates the outline of a variation example of a configuration of the illumination optical system according to the present embodiment. An illumination optical system 101 exemplified in FIG. 7A uses illumination light emitted from the liquid fiber LG, which is different from the illumination optical system 100 exemplified in FIGS. 1 and 2. Other configurations are the same as those of the illumination optical system 100 exemplified in FIGS. 1 and 2.

FIG. 7B is a sectional view of the liquid fiber included in the illumination optical system exemplified in FIG. 7A. The liquid fiber LG is optical fiber in which the core portion of the fiber is filled with a liquid as exemplified in FIG. 7B. Instead of directly using the illumination light emitted from the light source, the effect similar to that of the illumination optical system 100 exemplified in FIGS. 1 and 2 can be acquired.

FIG. 8 illustrates the outline of another variation example of a configuration of the illumination optical system according to the present embodiment. An illumination optical system 102 exemplified in FIG. 8 is different from the illumination optical system 100 according to the present embodiment exemplified in FIGS. 1 and 2 in that a collector lens is omitted. Other configurations are similar to those of the illumination optical system 100 exemplified in FIGS. 1 and 2.

In the illumination optical system 102 exemplified in FIG. 8, the first illuminating state and the second illuminating state can be selectively realized like the illumination optical system 100 exemplified in FIGS. 1 and 2 by simultaneously moving the light source S and the reflector R.

Embodiment 2

Figure 9:
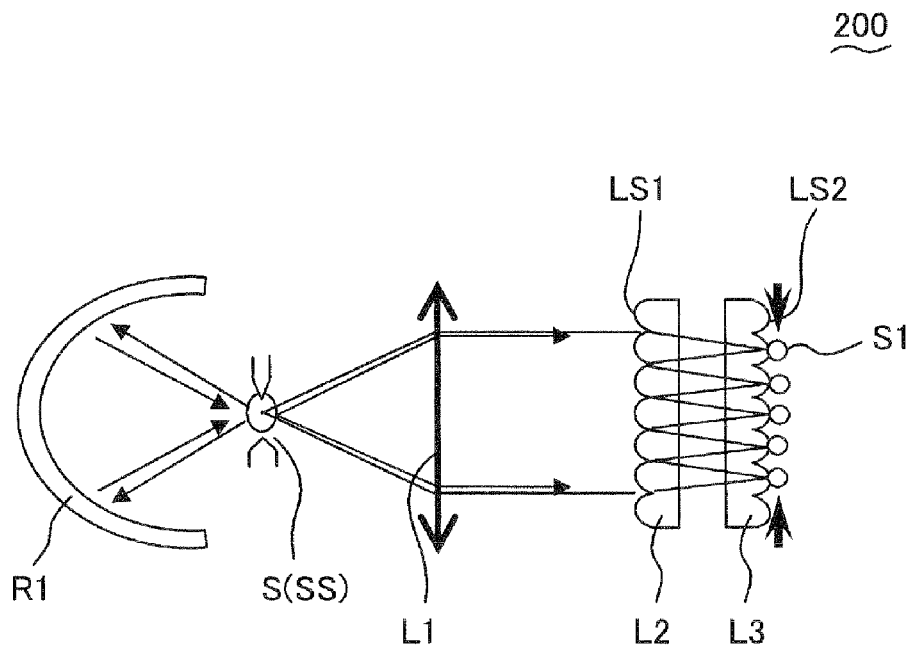
FIG. 9 illustrates the outline of the configuration of the illumination optical system in the third illuminating state according to the embodiment 2 of the present invention.
Figure 10:
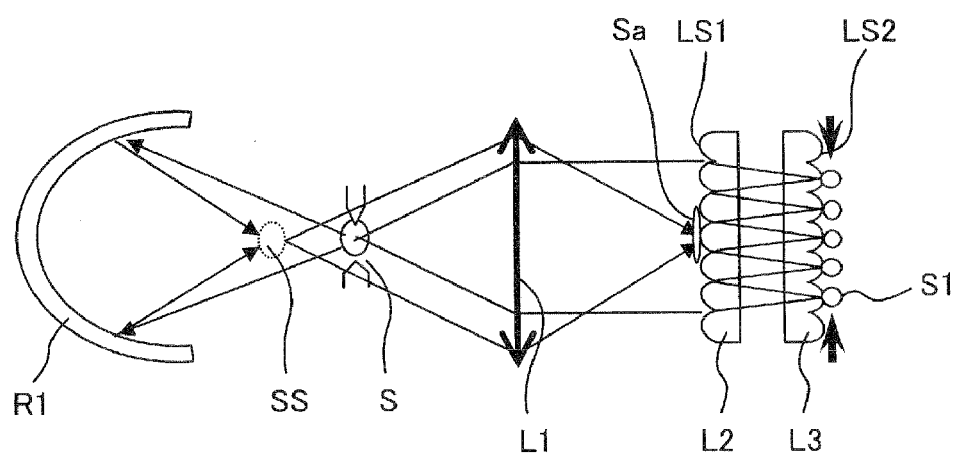
FIG. 10 illustrates the outline of the configuration of the illumination optical system in the fourth illuminating state according to the embodiment 2 of the present invention.

FIGS. 9 and 10 illustrate the outline of the configuration of the illumination optical system according to the present embodiment.

The configuration of an illumination optical system 200 exemplified in FIGS. 9 and 10 is similar to the configuration of the illumination optical system 100 exemplified in FIGS. 1 and 2 except a reflector R1 which reflects the illumination light emitted from the light source S toward the collector lens L1.

In the illumination optical system 200, in addition to the illumination light directly entering the collector lens L1 from the light source S (hereinafter referred to as "direct light"), the illumination light emitted from the light source S and entering the collector lens L2 through the reflector R1 (hereinafter referred to as "indirect light") is also irradiated on the sample surface O (not illustrated in the attached drawings).

The illumination optical system 200 can selectively realize the illuminating state exemplified in FIG. 9 (hereinafter referred to as a "third illuminating state") and the illuminating state exemplified in FIG. 10 (hereinafter referred to as a "fourth illuminating state") by changing the position of the light source image formed by the reflector R1.

Switching between the third illuminating state and the fourth illuminating state of the illumination optical system 200 is realized by the reflector R1 functioning as a switch unit. Practically, switching between the third illuminating state and the fourth illuminating state can be realized by the reflector R1 moving in the direction of the optical axis.

Each of the third illuminating state and the fourth illuminating state is described below.

In the third illuminating state exemplified in FIG. 9, the position of the light source image SS formed by the reflector R1 matches the position of the light source S. Therefore, the direct light and the indirect light pass the same route to the sample surface O (not illustrated in the attached drawings).

Practically, the illumination light (direct light and indirect light) is converted into substantially parallel light by the collector lens L1, and enters the lens array optical system. The illumination light that has entered the lens array optical system is divided on the first lens array surface LS1, and each beam of the divided illumination light is converged on the second lens array surface LS2. Therefore, the same number of light source images S1 as the lens elements where the illumination light enters are formed on the second lens array surface LS2 as in the first illuminating state of the illumination optical system 100 illustrated in FIG. 1.

Therefore, in the third illuminating state, the illumination optical system 200 can realize the Koehler illumination of high uniformity while suppressing both the unevenness in illumination depending on the luminance distribution of a light source and the unevenness in illumination depending on the light distribution characteristic of a light source. In the third illuminating state, the indirect light is irradiated on the sample surface O (not illustrated in the attached drawings). Therefore, in the third illuminating state, the illumination optical system 200 can realize brighter illumination while maintaining the uniformity in illumination equivalent to the uniformity in the first illuminating state.

In the fourth illuminating state exemplified in FIG. 10, the position of the light source image SS formed by the reflector R1 does not match the position of the light source S. Therefore, the direct light and the indirect light reaches the sample surface O (not illustrated in the attached drawings) through different routes.

Practically, the direct light is converged on the second lens array surface LS2, and the light source image S1 is formed on the second lens array surface LS2. On the other hand, the indirect light is converged on the incident surface (first lens array surface LS1) of the lens array optical system by the collector lens L1, and the light source image Sa is formed on the first lens array surface LS1.

Therefore, in the fourth illuminating state, the illumination optical system 200 simultaneously realizes the Koehler illumination equivalent to the first illuminating state by the direct light and the critical illumination equivalent to the second illuminating state by the indirect light.

With the above-mentioned configuration, a part of the illumination light that cannot reach the sample surface O (not illustrated in the attached drawings) by the vignetting etc. occurring in the optical element (for example, an objective, a fluorescent cube, etc.) in the optical path in the third illuminating state as the Koehler illumination can be used as the critical illumination. Accordingly, brighter illumination than the third illuminating state is realized.

As described above, the illumination optical system 200 according to the present embodiment can selectively realize the third illuminating state brighter than the first illuminating state and as high in uniformity as the first illuminating state, and the fourth illuminating state which simultaneously realizes the first illuminating state and the second illuminating state.

In the illumination of a microscope, since the uniformity in illumination is generally very important, the configuration in which the Koehler illumination is realized when the light source S and the light source image SS by the indirect light match each other is exemplified, but the present invention is not limited to this application. That is, there can be the configuration in which the critical illumination is realized when the light source S matches the light source image SS by the indirect light.

Embodiment 3

Figure 11:
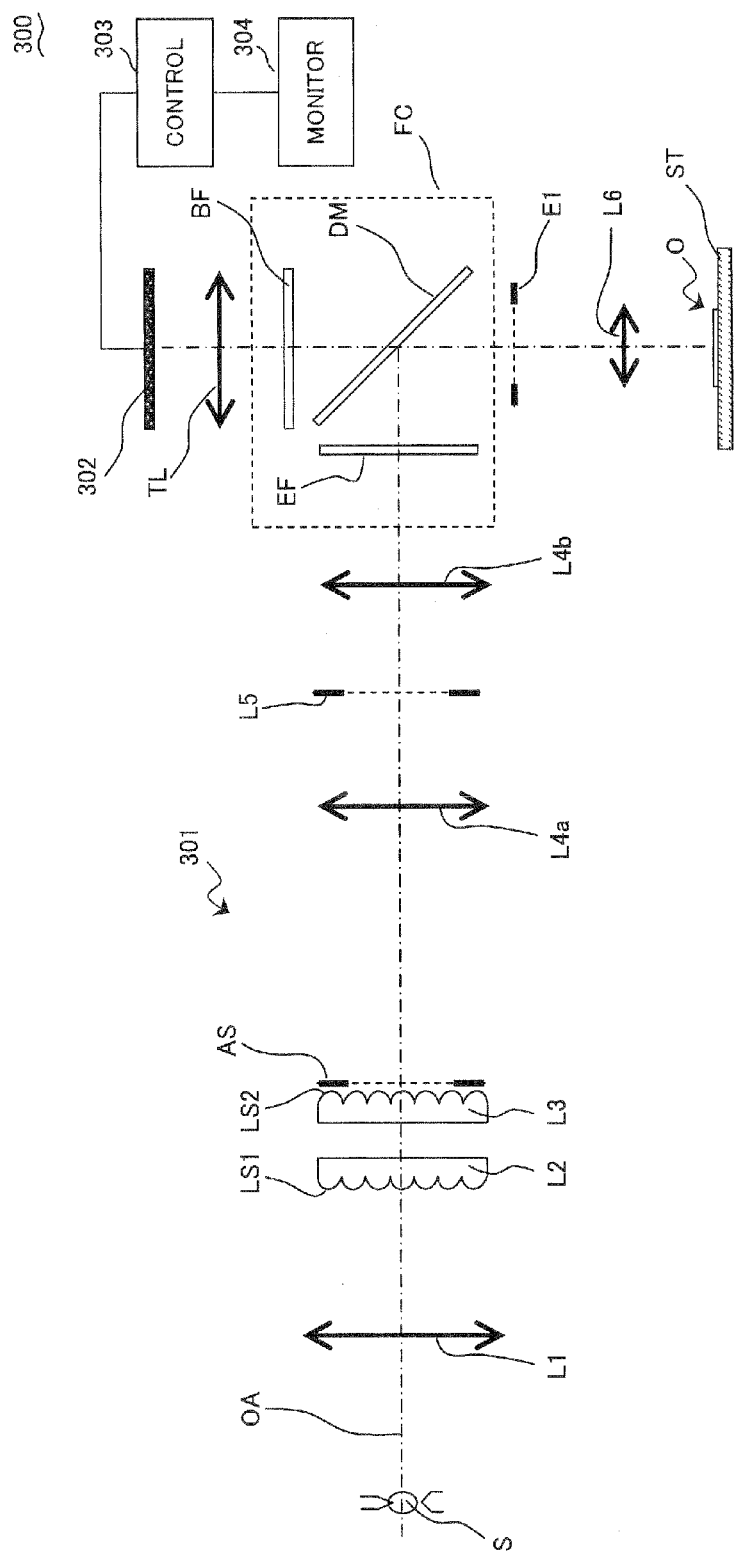
FIG. 11 exemplifies the outline of the configuration of the fluorescent microscope according to the embodiment 3 of the present invention.

FIG. 11 exemplifies the outline of the configuration of the fluorescent microscope according to the present embodiment. A fluorescent microscope 300 exemplified in FIG. 11 includes an illumination optical system 301 equivalent to the illumination optical system 100 according to the embodiment 1 exemplified in FIGS. 1 and 2.

The fluorescent microscope 300 exemplified in FIG. 11 includes the illumination optical system 301 for illuminating the sample surface O on the stage ST, an aperture stop AS, a fluorescent filter cube FC, a tube lens TL, an image pickup element 302, a control device 303 for controlling the image pickup element 302, and a monitor 304 for displaying an image of the sample surface O. The fluorescent filter cube FC includes an exciter filter EF, a dichroic mirror DM, and a barrier filter BF. The aperture stop AS is provided near the second lens array surface LS2.

The illumination light emitted from the light source S passes through the illumination optical system 301 and enters the exciter filter EF. The illumination light having a wavelength appropriate for excitation passes through the exciter filter EF. The illumination light that has passed through the exciter filter EF is reflected by the dichroic mirror DM, and illuminates the sample surface O through the objective L6.

A fluorescent substance is excited on the sample surface O irradiated with the illumination light, and the fluorescence is emitted from the surface. The fluorescence passes through the dichroic mirror DM through the objective L6. Since the light having an unnecessary wavelength is cut off by the barrier filter BF, only the fluorescence having a desired wavelength can be led to the image pickup element 302 by the tube lens TL. In the image pickup element 302, the fluorescence is converted into an electric signal by optoelectronic conversion. The electric signal is transmitted to the control device 303 to generate an image. The control device 303 allows the monitor 304 to display a fluorescent image on the sample surface O.

Since the fluorescent microscope 300 according to the present embodiment includes the illumination optical system 301 equivalent to the illumination optical system 100 according to the embodiment 1, the first illuminating state of high uniformity in which both of the unevenness in illumination depending on the luminance distribution of the light source S and the unevenness in illumination depending on the light distribution characteristic of the light source S are suppressed, and the second illuminating state which is brighter than the first illuminating state and has higher uniformity than the conventional critical illumination can be selectively realized.

FIG. 11 illustrates an example in which the illumination optical system included in the fluorescent microscope 300 is equivalent to the illumination optical system 100 according to the embodiment 1, but the present invention is not limited to this example. The fluorescent microscope 300 can include the illumination optical system 200 according to the embodiment 2. In this case, the fluorescent microscope 300 according to the present embodiment can selectively realize the third illuminating state brighter than the first illuminating state and as high in uniformity as the first illuminating state, and the fourth illuminating state which simultaneously realizes the first illuminating state and the second illuminating state.

Figure 12:
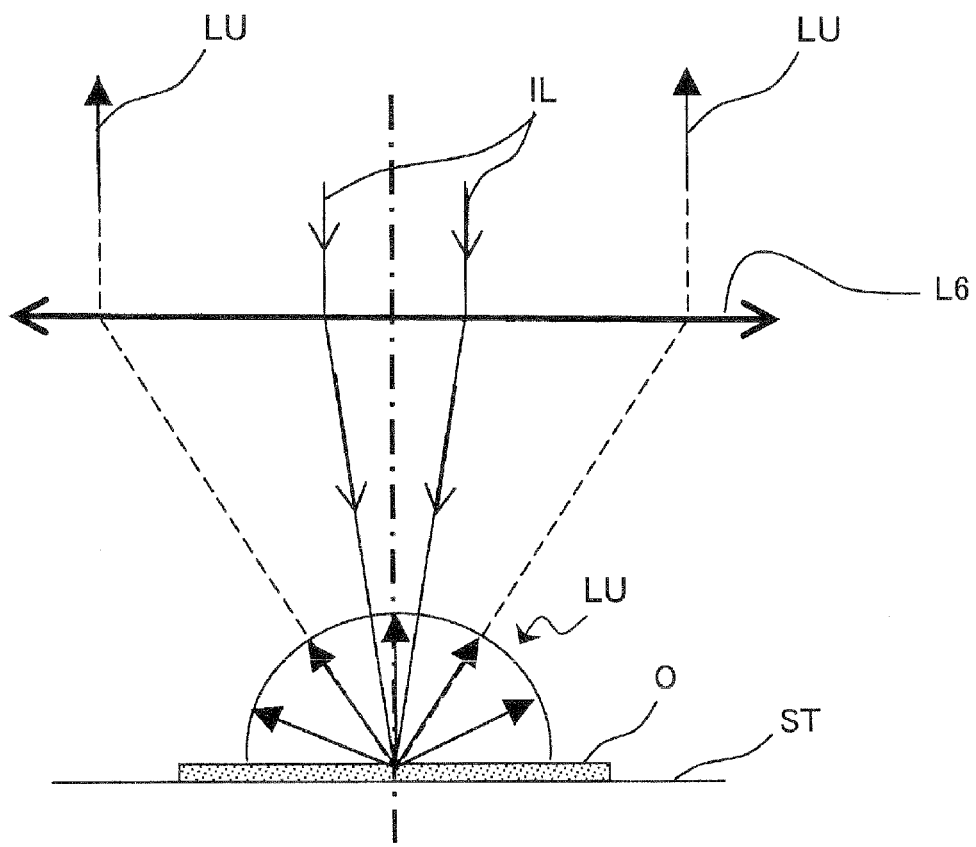
FIG. 12 is an explanatory view of the relationship between the illumination light and the fluorescence in the fluorescent microscope exemplified in FIG. 11.

FIG. 12 is an explanatory view of the relationship between the illumination light and the fluorescence in the fluorescent microscope according to the present embodiment. The illumination optical system according to embodiments 1 and 2 is described as especially preferable for a fluorescent microscope with reference to FIG. 12.

The fluorescent microscope 300 including the illumination optical system 301 does not observe the light reflected by the sample surface O, but detects the fluorescence LU generated from the fluorescent substance existing on the sample surface O and observes the sample surface O. Since the fluorescence is emitted in every direction independent of the incident angle (numerical aperture of illumination) of the illumination light, the numerical aperture of the observed light taken in the objective L6 does not depend on the numerical aperture of the illumination in the fluorescent microscope 300 unlike the microscope for detecting reflected light.

Therefore, with the fluorescent microscope 300, the effect of the numerical aperture of the illumination light on an observed image is relatively small. For example, as described above, although the illumination is performed with a small diameter of the luminous flux at the pupil of the objective L6 in the second illuminating state and a relatively small numerical aperture, a good and bright fluorescent image can be observed. Therefore, the illumination optical system according to the embodiments 1 and 2 can be preferably applied to a fluorescent microscope.

What is claimed is:

1. An illumination optical system which irradiates a sample surface with light through an illuminating lens, comprising:
    a light source;
    a condensing optical system receiving the light emitted from the light source, wherein the condensing optical system is a collector lens; and
    a lens array optical system including a first lens array surface and a second lens array surface each formed by a plurality of lens elements;
    wherein:
    the first lens array surface has a conjugate relation with a focal position of the illuminating lens;
    the second lens array surface is placed at a back focal position of the lens array optical system and has a conjugate relation with a pupil position of the illuminating lens;
    the light source and the condensing optical system are arranged to form an image of the light source on the first lens array surface; and
    at least one of the light source and the collector lens functions as a switching unit for switching between a first illuminating state in which a plurality of images of the light source are formed on the second lens array surface and a second illuminating state in which an image of the light source is formed on the first lens array surface.

2. The system according to claim 1, wherein the switching unit changes a distance between the light source and the collector lens.

3. The system according to claim 1, wherein:
    the collector lens includes a plurality of lenses; and
    the switching unit moves a part of the plurality of lenses in a direction of an optical axis.

4. The system according to claim 1, wherein:
    the collector lens includes an attachable and detachable lens; and
    the switching unit attaches the attachable and detachable lens to and detaches from an optical axis.

5. The system according to claim 1, further comprising:
    a relay optical system provided between the lens array optical system and the illuminating lens,
    wherein a conditional expression of $$0.1 \leq H_L \cdot \beta_{CL} \cdot \beta_{RL}/\Phi \leq 1.3$$

is satisfied where: $H_L$ indicates a light source height of the light source; $\Phi$ indicates a pupil diameter of the illuminating lens; $\beta_{CL}$ indicates a magnification of the collector lens in the second illuminating state; and $\beta_{RL}$ indicates a magnification of the relay optical system.

6. The system according to claim 1, wherein when the second lens array surface matches the pupil position, a conditional expression of $$0.1 \leq H_L \cdot \beta_{CL}/\Phi \leq 1.3$$

is satisfied where: $H_L$ indicates a light source height of the light source; $\Phi$ indicates a pupil diameter of the illuminating lens; and $\beta_{CL}$ indicates a magnification of the collector lens in the second illuminating state.

7. An illumination optical system which irradiates a sample surface with light through an illuminating lens, comprising:
    a light source;
    a condensing optical system receiving the light emitted from the light source, the condensing optical system comprising a collector lens and a reflector reflecting the light emitted from the light source toward the collector lens; and
    a lens array optical system including a first lens array surface and a second lens array surface each formed by a plurality of lens elements;
    wherein:
    the first lens array surface has a conjugate relation with a focal position of the illuminating lens;
    the second lens array surface is placed at a back focal position of the lens array optical system and has a conjugate relation with a pupil position of the illuminating lens;
    the light source and the condensing optical system are arranged to form an image of the light source on the first lens array surface; and
    the reflector functions as a switching unit for switching between a third illuminating state in which the collector lens forms a plurality of images of the light source on the second lens array surface and a fourth illuminating state in which the collector lens forms an image of the light source on the first lens array surface and a plurality of images of the light source on the second lens array surface.

8. The system according to claim 7, wherein in the fourth illuminating state, the collector lens converges:
    direct light as illumination light which is emitted from the light source and directly enters the collector lens on the second lens array surface; and
    indirect light as illumination light which is emitted from the light source and enters the collector lens after being reflected by the reflector on the first lens array surface.

9. The system according to claim 7, wherein the switching unit changes a position of the image of the light source formed by the reflector.

10. An illumination optical system which irradiates a sample surface with light through an illuminating lens, comprising:
    a light source;
    a condensing optical system receiving the light emitted from the light source; and
    a lens array optical system including a first lens array surface and a second lens array surface each formed by a plurality of lens elements;
    wherein:
    the first lens array surface has a conjugate relation with a focal position of the illuminating lens;
    the second lens array surface is placed at a back focal position of the lens array optical system and has a conjugate relation with a pupil position of the illuminating lens;
    the light source and the condensing optical system are arranged to form an image of the light source on the first lens array surface;
    the illuminating lens includes a plurality of illuminating lenses having different optical specifications; and
    the illumination optical system is used with the plurality of illuminating lenses one of which is selectively inserted into an optical axis of the illumination optical system.

* * * * *